United States Patent [19]

Remijas

[11] 3,955,238
[45] May 11, 1976

[54] DOG BRUSH

[75] Inventor: Jerry Remijas, Chicago, Ill.

[73] Assignee: Corporate Products Research, Chicago, Ill.

[22] Filed: Sept. 6, 1974

[21] Appl. No.: 503,961

[52] U.S. Cl................................. 15/402; 15/396
[51] Int. Cl.².................... A47L 5/00; A47L 9/06
[58] Field of Search ............ 15/396, 397, 402, 143, 15/167 R, 410, 415, 344, 398, 400

[56] References Cited
UNITED STATES PATENTS

| | | | |
|---|---|---|---|
| 1,859,132 | 5/1932 | Fechtenburg | 15/402 |
| 1,901,866 | 3/1933 | Bryan | 15/167 R |
| 1,936,369 | 11/1933 | Riebel et al. | 15/402 |
| 2,228,091 | 1/1941 | Smith | 15/402 |
| 2,276,886 | 3/1942 | Smith | 15/402 |
| 2,715,240 | 8/1955 | Pieper et al. | 15/415 |
| 3,065,491 | 11/1962 | Amador | 15/396 |
| 3,708,824 | 1/1973 | Holubinka | 15/397 |
| 3,744,082 | 7/1973 | Marshall | 15/402 |
| 3,771,193 | 11/1973 | Hageal | 15/397 |
| 3,825,972 | 7/1974 | MacFarland | 15/402 X |

*Primary Examiner*—Stanley N. Gilreath
*Assistant Examiner*—C. K. Moore
*Attorney, Agent, or Firm*—Robert M. Wolters

[57] ABSTRACT

A dog brush is provided for attachment to a conventional vacuum cleaner. Semi-flexible plastic bristles are curved in the direction in which the brush is drawn across a dog, whereby to cradle loose hairs transversely of the air flow into the vacuum cleaner, and thus most efficiently to pull the loose hairs into the vacuum cleaner. Restrictive orifices are provided to increase velocity of air flow further to facilitate picking up loose hairs. The handle of the brush is oriented for most efficient brushing of a dog.

3 Claims, 4 Drawing Figures

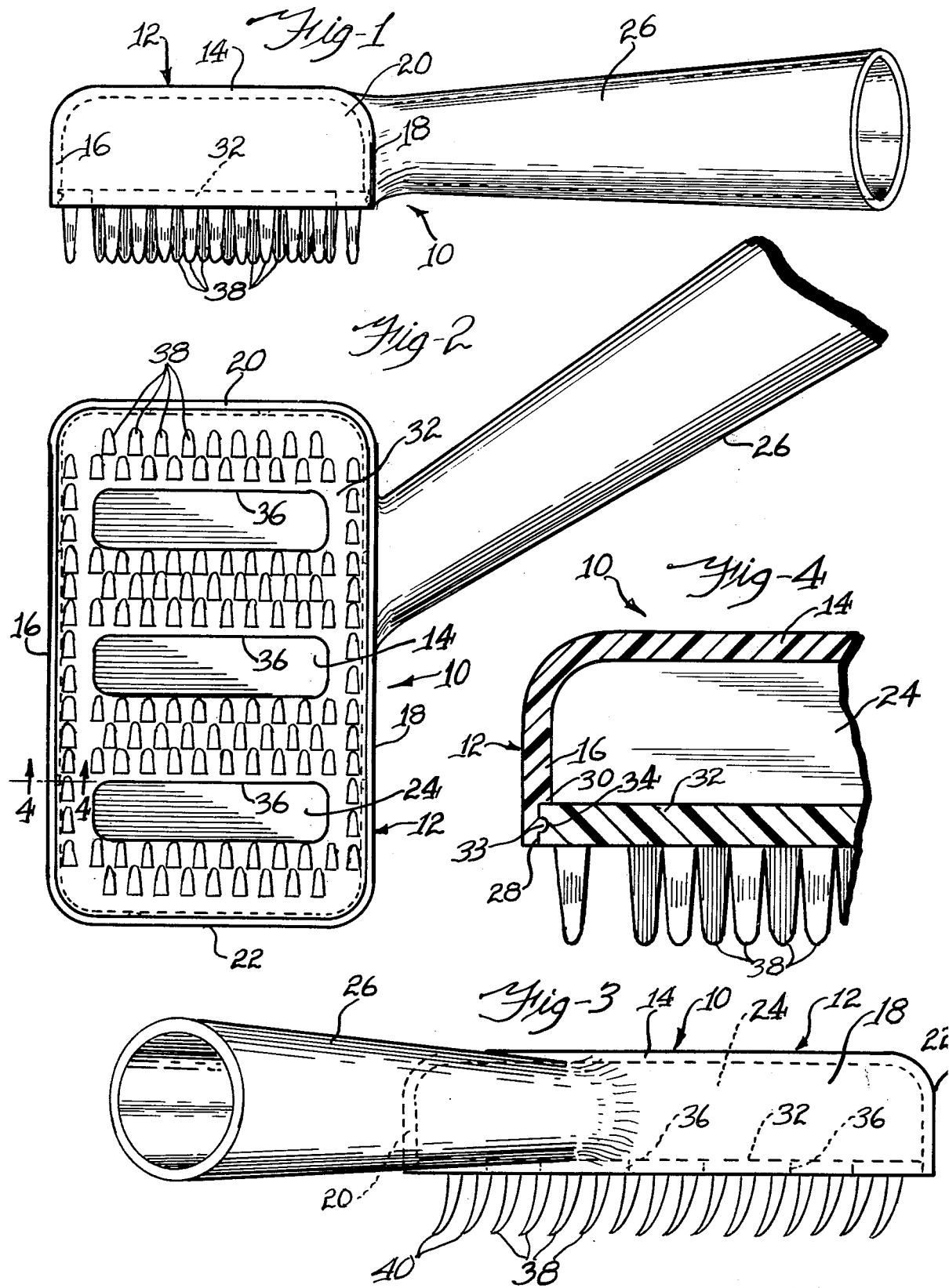

DOG BRUSH

BACKGROUND OF THE INVENTION

Vacuum cleaners having hoses thereon for attachment of various brushes for various cleaning purposes are well known in the art. The brushes or other tools for such vacuum cleaners are intended primarily for picking up dust and other small particulate matter. A certain amount of particulate matter is found in the hair of a dog, including dander, but the principle object to brushing a dog, other than improved appearance and general enhancement of the animal's coat from brushing is the removal of loose hairs. Insofar as I am aware prior art vacuum cleaner brushes have not been well adapted to removing loose hairs from a dog's coat, and further have tended to become rapidly clogged with dog hairs. Manual dog brushes which are not associated with a vacuum cleaner tend rather quickly to become filled up or clogged with dog hairs, and must frequently be cleaned.

OBJECTS OF THE INVENTION AND SUMMARY OF THE DISCLOSURE

The principle object of the present invention is to provide a novel brush for attachment to a vacuum cleaner hose, which brush is particularly well adapted for brushing the coat of a dog or other domestic animal.

It is further an object of the present invention to provide a dog brush for attachment to a vacuum cleaner wherein the shape and disposition of the bristles of the brush and the air flow are correlated for most efficient pickup and disposition of loose hairs.

In carrying out the foregoing objects, the present invention is provided with a multiplicity of rows of rather large bristles with the bristles in alternate rows staggered or offset. Sets of rows are interspersed amongst a plurality of air openings. The restricted openings so provided produce a high velocity air flow in a particularly efficient location relative to the bristles. The bristles are curved in the direction of stroking so as to cradle hairs for ease of pickup by the air flow. The handle is angled in such manner that the natural direction of stroking with the handle held in the right hand (parts can be reversed in manufacture for left hand operation) is in the direction of curvature of the bristles, as is desired. The bristles are of controlled flexibility, i.e., semi-rigid, so as to be able to cradle the hairs most efficiently, and yet not injure the animal. The entire brush is molded of plastic, for example, polyvinyl chloride, including the bristles, for simplicity of manufacture and production of a superior finished product.

In accordance with the present invention a long hose is provided for the vacuum cleaner so that the vacuum cleaner can be placed around the corner, behind an article of furniture, etc., whereby the noise level will be reduced and the animal thereby will not be frightened. In addition to routine brushing from time to time with suction applied to the brush, it is further contemplated that the hose of the vacuum cleaner could be attached to the outlet orifice of the vacuum cleaner, whereby warm air under pressure will be expelled from the brush, thus to facilitate grooming following a bath or a shampoo. By this procedure the hair is brushed into place and simultaneously dried, all with a maximum of pleasant feeling to the animal.

BRIEF DESCRIPTION OF THE DRAWINGS

The invention will best be understood with reference to the following specification when taken in connection with the accompanying drawings wherein:

FIG. 1 comprises a side view of a dog brush constructed in accordance with the principles of my invention;

FIG. 2 comprises an underside view of the dog brush of FIG. 1;

FIG. 3 comprises a side view thereof taken from the right side of FIGS. 1 and 2; and FIG. 4 comprises an enlarged sectional view through a portion of the brush as taken, for example, along line 4—4 in FIG. 2.

DETAILED DESCRIPTION OF THE ILLUSTRATED EMBODIMENT

The dog brush 10 of the present invention comprises a generally rectangular, box-shaped housing 12 of relatively shallow configuration. Original patent drawings FIGS. 1, 2 and 3 are substantially actual size of the preferred illustrative embodiment. The housing comprises a top wall 14, depending side walls 16 and 18, and depending end walls 20 and 22. The various walls are joined to one another at rounded corners to minimize turbulance of internal air flow, to avoid sharp corners on the outside that might cause discomfort or damage, and for increased strength. The top, side and end walls form an air plenum 24, and a shallow, conical, outwardly diverging handle 26 is formed integral with the housing 12, and specifically the side wall 18, opening into the plenum 24. The outer end of the handle 26 is provided with retension structure (not shown) for snapping on to the outside of the fitting at the end of the vacuum cleaner hose.

With particular reference to FIG. 4 it will be seen that the side and end walls are reset at 28 to provide a peripheral internal shelf 30 for receipt of a bottom wall 32. Peripherally spaced, inwardly directed protuberances 33 are provided interiorly of the side and end walls in the reset portion, and respectively are received in complementary dimples or depressions 34 in the periphery of the bottom wall 32.

The bottom wall 32, as best may be seen in FIG. 4, is slightly thicker than the remaining walls, since this wall is apertured, and since it is not reinforced by being molded integral with any other parts. The bottom wall 32 is generally rectangular in shape, having rounded corners to conform to the body or housing 12, and is provided with relatively narrow, spaced apertures 36. The apertures 36 are rather narrow rectangles with their major axis transverse of the major axis of the bottom wall 32, the corners again being rounded. The relatively small size of these apertures as contrasted with the size of the plenum 24 insures increased air velocity through the apertures.

The bottom wall is completed by a plurality of bristles 38 formed integral therewith, the bottom wall and bristles being molded of a suitable plastic, polyvinyl chloride being a preferred example for this as well as for the brush body or housing and handle. The bristles are curved and tapered, as best may be seen in FIG. 3, the curve being concave toward the end wall 20 with the tips 40 of the respective bristles leading the bases or attachments thereof to the bottom wall, as best may be seen in FIG. 3. As will be seen in FIG. 2 three transverse rows of bristles are provided between adjacent apertures 36, with two transverse rows being provided between the outer apertures and the end walls. As will readily be seen the bristles of successive rows are offset. In addition, there are side rows of bristles adjacent the side walls 16 and 18 and generally parallel to such side walls.

The handle 26, as well as being angled and extending outwardly from the side wall 18 and generally in the direction of the end wall 20, is relatively closer to the end wall 20 than to the end wall 22, with the outer end of the handle extending well past the end wall 20. Thus, the brush is readily handled by grasping the handle 26 in the right hand, as is the normal thing for a right-handed person to do. It will be understood that it is contemplated that left-handed models also may be made by having the handle 26 integral with the side wall 16, rather than with the side wall 18. The handle and the brush are readily pulled toward the person handling the same with the leading tips 40 of the bristles preceding the bases thereof. The bristles are sufficiently flexible as not to hurt a dog or other animal, yet they are sufficienty rigid that they do not bend from their initial shape, whereby loose hairs tend to become readily oriented crosswise of the direction of travel of the brush and are cradled by the bristles. With the bottom wall 32 spaced from the animal's body only by the length of the bristles 38, the air flow is mostly transverse of the bristles into the apertures 36 at rather high velocity through the apertures. Thus, the transversely arranged hairs are pulled into the apertures by the differential air pressure caused by the vacuum cleaner, and pass into the storage bag or compartment of the vacuum cleaner rather than clogging the brush. The shape and disposition of the bristles, besides helping to trap loose hairs, causes most efficient brushing of attached hairs, whereby greatly to enhance the appearance of any dog or domestic animal.

The fact that the number of bristles is rather restricted, in accordance with the drawing, with each bristle being a relatively large size as contrasted with the usual multiplicity of fine bristles insures against clogging of the brush, and also provides for an efficient massage of the animal's body, thereby promoting good health and a feeling of well being.

As will be understood, the vacuum cleaner itself tends to be rather noisy, and many dogs and other domestic animals are frightened by such noise. However, use of a long hose allows the vacuum cleaner to be placed around the corner, or behind an article of furniture, or otherwise where noise will be minimized, and at least spaced away from the animal so as not to frighten it. Although the brush as heretofore described is generally used for vacuuming a dog's coat to remove loose hair, dander, etc., it is contemplated that the hose could be placed on an outlet of the vacuum cleaner rather than attached to the inlet. Thus, relatively warm air will be expelled with some velocity from the apertures 36. This is particularly efficacious following shampooing of a dog, thus to dry the hair as well as to brush and groom it into proper place.

The bristles, each being relatively thick, and all being formed integral with the bottom wall 32 act to reinforce this wall, rather than weakening it, as is the common practice when tuffs of small diameter bristles are inserted in holes in a supporting wall.

In the event that any hairs, etc. should clog the interior of the plenum 24, the snap-in construction of the bottom wall 32 allows this wall likewise readily to be snapped out, thus providing complete access to the plenum for cleaning thereof. When the bottom wall is out, it is readily washed thoroughly, and can even be run through an automatic washing machine. Furthermore, the entire brush is readily adapted to washing or other fluid cleaning, being molded of corrosion resistent plastic material.

The specific example of the invention as herein shown and described is for illustrative purposes only. Various changes in structure will no doubt occur to those skilled in the art, and will be understood as forming a part of the present invention insofar as they fall within the spirit and scope of the appended claims.

The invention is claimed as follows:

1. A brush for dogs and the like adapted to be attached to a vacuum cleaner, comprising a body providing a plenum, means on said body adapted for connection to a vacuum cleaner hose and opening into said plenum, a wall on said body having aperture means opening into said plenum, and a plurality of bristles on said wall arranged in a plurality of rows on opposite sides of and spaced from said aperture means and extending outwardly of said wall, said bristles being curved and having outer ends leading the ends secured to said wall in the intended direction of brushing and being positioned to avoid obstruction of said aperture means, said wall being longer in the intended direction of brushing than it is transversely therof and wherein the aperture means in said wall comprises a plurality of relatively narrow apertures elongated transversely of the direction of intended brushing, and rows of bristles are disposed between said apertures and outwardly thereof.

2. A brush as set forth in claim 1 wherein said body is open on one side and has an internal recess on said side providing a shelf, said wall being received in said recess against said shelf, and snap-in means coacting between said body and said wall to hold said wall in place and comprising peripherally spaced protuberances and complementary recesses.

3. A brush as set forth in claim 1 wherein the means adapted to be attached to a vacuum cleaner comprises a hollow handle integral with said body and angling outwardly therefrom in fixed relation thereto generally in the intended direction of brushing.

\* \* \* \* \*